(12) United States Patent
Chin et al.

(10) Patent No.: US 7,561,277 B2
(45) Date of Patent: Jul. 14, 2009

(54) MEMS FIBER OPTIC MICROPHONE

(75) Inventors: Ken K. Chin, Pine Brook, NJ (US);
Guanhua Feng, Dover, NJ (US); Harry Roman, East Orange, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 262 days.

(21) Appl. No.: 11/750,643

(22) Filed: May 18, 2007

(65) Prior Publication Data

US 2008/0049230 A1 Feb. 28, 2008

Related U.S. Application Data

(60) Provisional application No. 60/801,910, filed on May 19, 2006, provisional application No. 60/801,943, filed on May 19, 2006.

(51) Int. Cl.
G01B 9/02 (2006.01)
(52) U.S. Cl. .................................................... 356/480
(58) Field of Classification Search ............... 356/35.5, 356/477, 480; 250/227.19, 227.27; 385/12
See application file for complete search history.

(56) References Cited

U.S. PATENT DOCUMENTS

| | | | |
|---|---|---|---|
| 4,343,657 A | 8/1982 | Ito et al. | |
| 4,933,545 A | 6/1990 | Saaski et al. | |
| 5,311,485 A | 5/1994 | Kuzmenko et al. | |
| 6,055,080 A | 4/2000 | Furstenau et al. | |
| 6,351,593 B1 | 2/2002 | Pollack et al. | |
| 6,628,799 B2 | 9/2003 | Fukuda | |
| 6,631,638 B2 | 10/2003 | James et al. | |
| 6,820,488 B2* | 11/2004 | Lenzing et al. | ............... 73/705 |
| 6,928,879 B2 | 8/2005 | Partridge et al. | |
| 6,967,362 B2 | 11/2005 | Nam et al. | |
| 7,224,465 B2* | 5/2007 | Balachandran et al. | ....... 346/480 |
| 2004/0067005 A1* | 4/2004 | Miyazawa et al. | ............ 385/13 |
| 2004/0119981 A1 | 6/2004 | May | |
| 2005/0134837 A1 | 6/2005 | Sarkozi et al. | |
| 2005/0157305 A1 | 7/2005 | Yu et al. | |

OTHER PUBLICATIONS

M. Born and E. Wolf, Principles of Optics, p. 327, 6th Edition, Pergamon Press, (1980).
E. Hecht, Optics, p. 336, 2nd Edition, Addison-Wesley Publishing Co. (1987).
R. A. Atkins, J. H. Gardner, W. N. Gibler, C. E. Lee, M. D. Oakland, M. O. Spears, V. P. Swenson, H. F. Taylor, J. J. McCoy, and G. Beshouri, "Fiber Fabry-Perot pressure sensors for internal combustion engines", Applied Optics, vol. 33, No. 7, pp. 1315-1319, Mar. 1994.

(Continued)

Primary Examiner—Michael A Lyons
(74) Attorney, Agent, or Firm—Timoty X. Gibson, Esq.; Gibson & Dernier LLP

(57) ABSTRACT

The theory, design, fabrication, and characterization of MEMS (micro electrical mechanical system) Fabry-Perot diaphragm-fiber optic microphone are described in the present invention. By using MEMS technology in processing and packaging, a square 1.9 mm×1.9 mm, 2 μ thick $SiO_2$ diaphragm with a 350 μ square embossed center of silicon is mechanically clamped to the ferrule of a single mode fiber to keep its closeness (5 μ) and perpendicular orientation with respect to the diaphragm. Static measurement of optical output power versus the pressure on membrane reveals more than one period of Fabry-Perot interference, thereby generating a Fabry-Perot diaphragm-fiber interferometer device accurately reproducing audible acoustic wave.

19 Claims, 5 Drawing Sheets

OTHER PUBLICATIONS

Youngmin Kim and Dean P. Neikirk, "Design for Manufacture of Micro Fabry-Perot Cavity-based Sensors," Sensors and Actuators A 50, Jan. 1996, pp. 141-146.

B. Yu, D. W. Kim, J. Deng, H. Xiao and A. Wang, "Fiber Fabry-Perot sensors for detection of partial discharges in power transformers", Applied Optics, vol. 42, No. 16, pp. 3241-3250, Jun. 2003.

M .Yu, "Acoustic Measurements Using a Fiber Optic Sensor System", Journal of Intelligent Systems and Structures, Vo. 14, No. 7, 409-414 (2003).

Xiaodong Wang, et al. "an ultra-sensitive optic MEMS sensor for partial discharge detection". Journal of Micromechanics and Microengineering, vol. 15, pp. 521-527 (2005).

International Search Report and Written Opinion of Feb. 13, 2008 in International Application No. PCT/US07/11955, filed May 18, 2007.

Amnon Yariv, Optic Electronics, 3rd edition, p. 29, Library of Congress Cataloging in Publication Data, (1985).

S. Timoshenko, Strenght of Materials, Part II, 3rd Edition, p. 97, D. Van Nostrand Co., 1956.

Mario di Giovanni, Flat and Corrugated Diaphragm Design Handbook, Marcel Dekker, New York and Base, 1982.

P. M. Eleftherion, "Partial Discharge XXI: Acoustic Emission-Based PD Source Location in Transformers", IEEE Electrical Insulation Magazines, No. 6, pp. 22-26 Nov./Dec. 1995.

M. Minhas, J.P. Reynders, P.J. de Klerk: "Failure in power system transformers and appropriate monitoring techniques", 11th Int. Symposium on High Voltage Engineering, London, paper 1.94.S23, (1999).

I Oanca, GY Yang, J Katsifolis, E Tapanes, "Simultaneous Wavelength Multiplexed Fiber Optic Communications And Cable Integrity Monitoring" Lasers and Electro-Optics, 1997. CLEO/Pacific Rim'97.

International Search Report and Written Opinion for corresponding PCT application PCT/US07/11954 (Form PCT/ISA/220/210) darted Dec. 5, 2008.

* cited by examiner

MEMS FIBER OPTIC MICROPHONE

CROSS REFERENCE TO RELATED APPLICATIONS

This application claims the benefit of U.S. Provisional Application No. 60/801,910 entitled "MEMS Fiber Optic Microphone" filed May 19, 2006 which is incorporated by reference herein in its entirety and U.S. Provisional Application No. 60/801,943 entitled "Aligned Embossed Diaphragm Based Fiber Optic Sensor" filed May 19, 2006 which is incorporated herein by reference in its entirety.

FIELD OF THE INVENTION

This invention involves the design and fabrication of a new Fabry-Perot diaphragm-fiber optic microphone by using MEMS technology in processing and packaging. The currently described microphone permits direct amplification of audible signal without requiring modulation or demodulation.

BACKGROUND OF THE INVENTION

Commercially available microphones or acoustic sensors in the audible frequency range (20-20,000 Hz) convert mechanical pressure wave to electrical signal (current or voltage). Fiber optic microphones have been proposed [1-3] however, they are non-functional or ineffective because they are either interference based, utilizing a piece or coil of optical fiber as the sensing element, or intensity based, using a diaphragm as the pressure wave sensing element. Sensors with diaphragm-fiber for acoustic signal sensing or pressure sensing, especially under high temperature, were inaccurately reported as Fabry-Perot type interferometer devices. As Fabry-Perot multiple beam interference is a static phenomenon, static dependence of output optic power versus applied pressure follows the Airy function, which is approximated by a harmonic function, to confirm that the observed pressure or pressure wave sensing is indeed due to Fabry-Perot interference, not due to intensity modulation or due to diaphragm tilting. By using MEMS technology in sensor processing and packaging, a truly Fabry-Perot sensor working as an acoustic sensor in the audible range has been demonstrated.

SUMMARY OF THE INVENTION

The present invention is a Fabry-Perot diaphragm fiber optic microphone, which was fabricated with MEMS (micro electric mechanical system) technology. In one embodiment, the microphone contains a diaphragm which is clamped to the ferrule of the single mode fiber. The diaphragm structure may contain three thicknesses which control various frequency responses. The inner area can be embossed to minimize the interference gap width between the diaphragm and the fiber endface as well as ensure proper alignment between the fiber and the diaphragm.

BRIEF DESCRIPTION OF THE DRAWINGS

To assist those of ordinary skill in the relevant art in making and using the subject matter hereof, reference is made to the appended drawings, wherein.

DETAILED DESCRIPTION OF THE INVENTION

Figure 1:
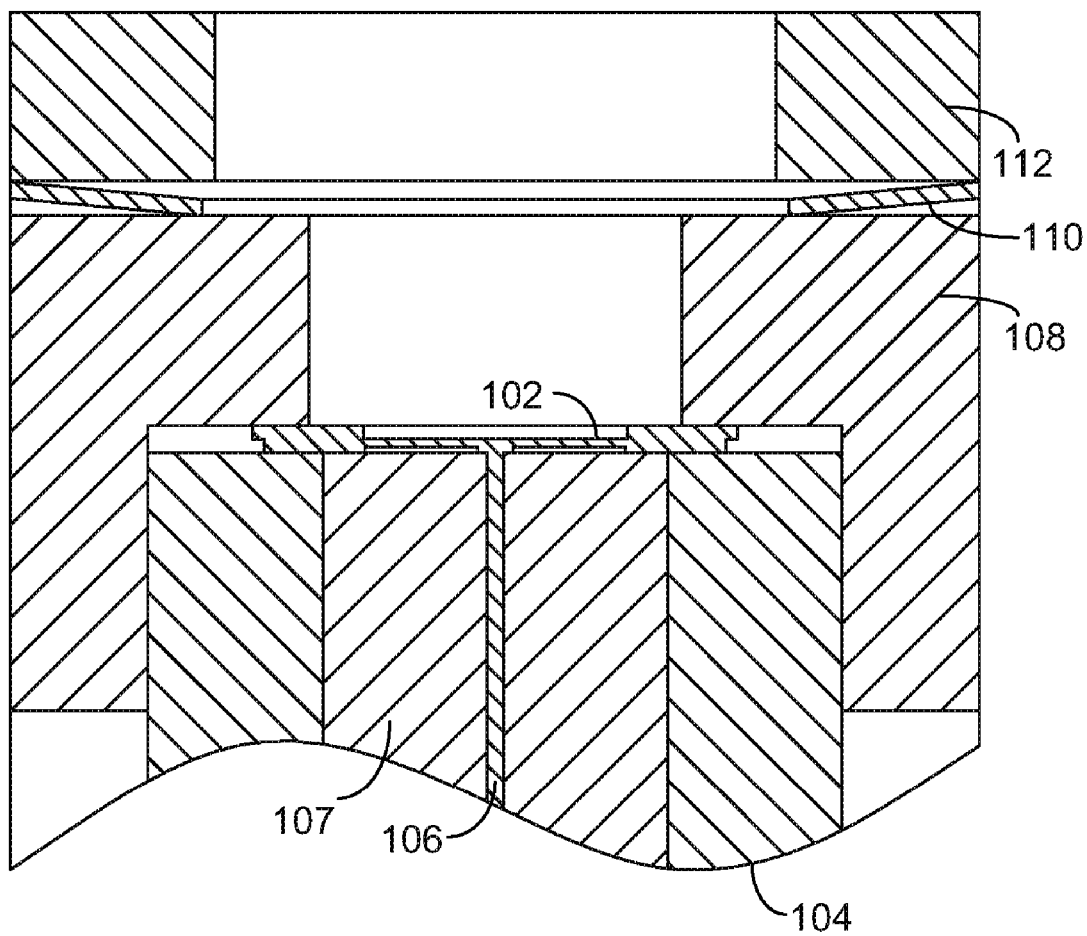
FIG. 1 is a drawing illustrating the design of a broadband Fabry-Perot Diaphragm-Fiber Optic Microphone.
Figure 2:
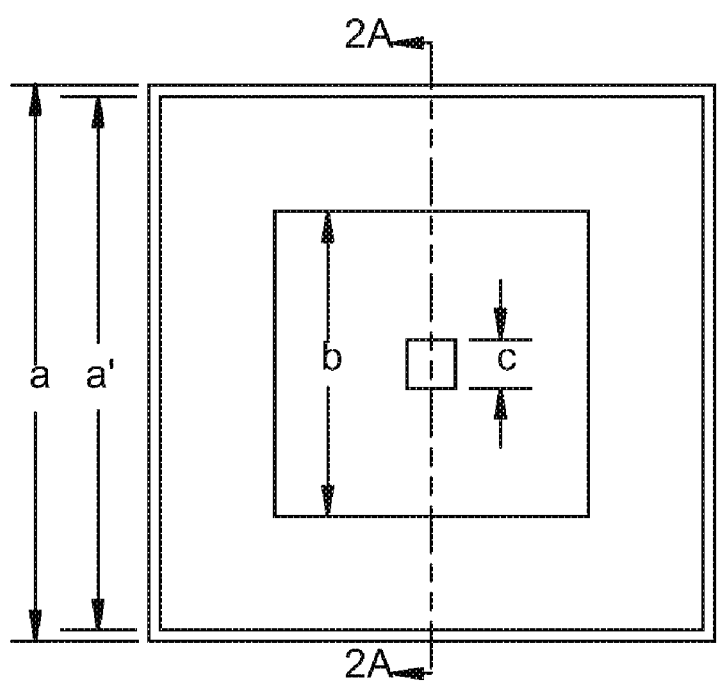
FIGS. 2 and 2A are drawings illustrating the details of the Diaphragm of Fiber Optic Microphone, wherein a=3.5 mm, a'=3.4 mm, b=1.9 mm, c=350 μ, u=200 μ, d=80 μ, g (interference gap width L)=5 μ, t=2 μ.
Figure 2A:
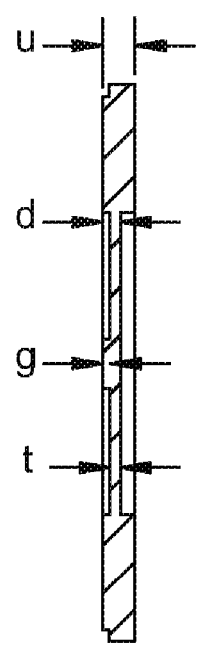
Figure 3:
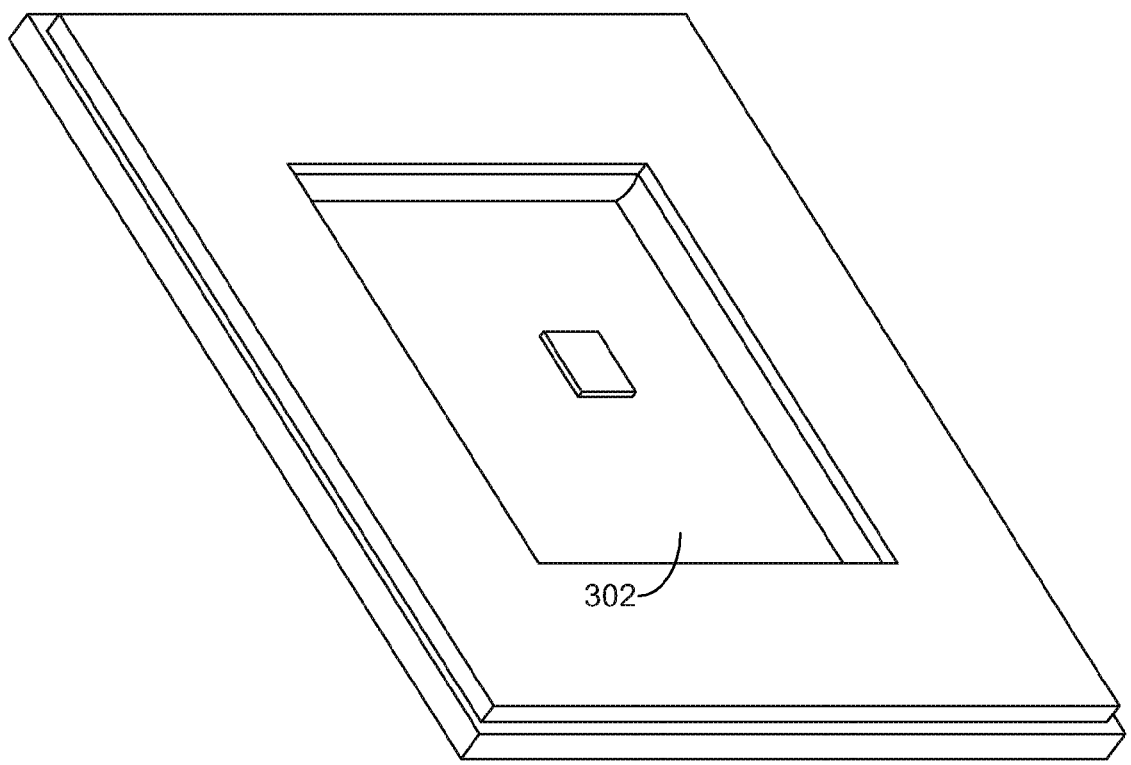
FIG. 3 is a micrograph of the diaphragm of a MEMS Fiber Optic Microphone.

Definition Of Symbols $V_{FP}$ the output voltage of the DFOS
$V_{FPo}$ the maximum of output voltage of the DFOS
n refractive index of the medium; for air n~1
λ wavelength of the light used for the DFOS
L the width of the narrow gap between the back of the diaphragm and the end surface of the single mode optic fiber
$L_o$ the equilibrium width of the narrow gap diaphragm and the optic fiber
$\phi_o$ the Q-point phase factor determined by the equilibrium width of the interference gap
E Young's modulus of the material of the diaphragm
ν Poisson coefficient of the material of the diaphragm
η the constant of proportionality in the equation of displacement versus pressure, which is dependent on the geometric shape of the diaphragm
u the thickness of the silicon wafer (or other material) used for the fabrication of the DFOS diaphragm
t the thickness of the diaphragm of the DFOS
a the square silicon chip (or other material) size of the DFOS
b the size or length of the square diaphragm of the DFOS
c the size of the embossed square center
e the length of the microchannel
f the width of the microchannel
f' the width of the narrow bottleneck of the microchannel
$D_{out}$ the external diameter of the stainless steel tube for the assembling of the DFOS
$D_{in}$ the internal diameter of the stainless steel tube for the assembling of the DFOS, which is equal to the diameter of the ferrule
$P_0$ the pressure needed for the diaphragm to bend ⅛ of the wavelength of the light λ/n
$P_{atm}$ the atmospheric pressure
$P_a$ the maximum pressure of the acoustic wave
$P_f$ the pressure at the front side of the diaphragm of the DFOS
$P_b$ the pressure at the back side of the diaphragm of the DFOS
$P_l$ the pressure at the lateral side of the diaphragm of the DFOS
$P_{cap}$ capillary pressure of the liquid in the microchannel
$P_1$ the initial air pressure of the cavity, or at the backside of the diaphragm before the DFOS is immersed in the liquid
$P_2$ the final air pressure of the cavity, or at the backside of the diaphragm after the DFOS is immersed in the liquid
$V_1$ the initial air volume of the cavity or the backside of the diaphragm before the DFOS is immersed in the liquid
$V_2$ the final air volume of the cavity or at the backside of the diaphragm after the DFOS is immersed in the liquid
ρ the density of the liquid the DFOS is immersed in
g gravitational acceleration, ~9.8 m/s²
h the depth of the liquid
NA numerical aperture of the fiber
$\theta_{beam}$ angle of spreading of the Gaussian beam
$w_o$ waist of the Gaussian beam
$z_o$ Rayleigh length of the Gaussian beam
R wave front radius of the Gaussian beam $n_f$ refractive index of the core of the step-index fiber $n_c$ refractive index of the cladding of the step-index fiber The present invention is a Fabry-Perot diaphragm fiber optic microphone, which was fabricated with MEMS (micro electric mechanical system) technology. FIG. 1 is one embodiment of the overall structure of the microphone. In this embodiment, diaphragm 102 is clamped to the stainless steel ferrule 104 of the single mode fiber 106 (which is enclosed by zinconia ferrule 107) by a washer 108, disk spring 110, and window cap 112. The detailed structure of the three thicknesses of the diaphragm is shown in FIG. 2 (and a side view, FIG. 2A). The outer area 3.4 mm×3.4 mm (the length of one edge of the outer area is indicated by a') is responsible for higher frequency response. It has a thickness of 280 μ (see thickness u in FIG. 2A) which is almost the same as the clamped area (one edge of the clamped area is indicated by a). The middle area 1.9 mm×1.9 mm is extremely thin (one edge of the middle area is indicated by b), only 2 μ thick (see thickness t in FIG. 2A), where the diaphragm's intrinsic frequency is about 150 Hz. The center square of 350 μ×350 μ (one edge of the center square is indicated by c) is the embossed center to keep the interference gap width between the diaphragm and the fiber endface as small as 5 μ. The embossed center also helps keep the fiber and diaphragm properly aligned. The effect of the embossing on the microphone's frequency response is negligible. FIG. 3 is the optical micrograph of the diaphragm of this embodiment of the MEMS Fabry-Perot fiber optic microphone. Note that the 2 μ thick middle area 302 is transparent. Multiple light sources are compatible with the present invention. One embodiment includes using a DFB single mode laser. Another embodiment uses a lower cost light emitting diode (LED) as the light source.

Using the plane wave Airy function of Fabry-Perot interferometry as an approximation of multiple interference of the light in the gap between the diaphragm and the fiber endface [1]

$$I^{(o)} = \frac{F \sin^2 \frac{\delta}{2}}{1 + F \sin^2 \frac{\delta}{2}} I^{(i)} \quad (1)$$

where $I^{(i)}$ is the intensity of the incident light, and $\delta$ the phase dependent on the optic path or interference gap width L.

$$\delta = \frac{4n\pi}{\lambda} L \quad (2)$$

F is the finesse, defined by $$F = \frac{4R}{(1-R)^2} \quad (3)$$

where R is the reflectance of the air-silicon oxide interface. For a microphone or diaphragm-fiber optic acoustic sensor according to the invention $$R = r^2 = \left(\frac{n'-n}{n'+n}\right)^2 = 0.035 \quad (4)$$

where n'=1.46 for silicon oxide at both sides of the gap, and n=1 for air. Substituting (3) to (2) yields F=0.15. When F is smaller than 0.2, equation (1) can be approximated as [1]

$$\frac{I^{(o)}}{I^{(i)}} \approx F \sin^2 \frac{\delta}{2} = \frac{F}{2}(1 - \cos \delta) = \frac{F}{2}\left[1 + \sin\left(\frac{4\pi n}{\lambda} L + \phi_o\right)\right] \quad (5)$$

where $\phi_o$, a phase factor related to the equilibrium gap width, determines the so-called Q-point. When $\phi_o=0$, the sensor has the highest sensitivity. Note that (5) depicts $I^{(o)}$ as a harmonic function of L, with low optical efficiency F/2 but high visibility or contrast defined as $$V = \frac{I^{(o)}_{max} - I^{(o)}_{min}}{I^{(o)}_{max} + I^{(o)}_{min}} \quad (6)$$

With the well known linear dependence of ΔL, small center deflection of an edge clamped diaphragm [2], on pressure P applied on the diaphragm $$\Delta L = \alpha \frac{b^4}{D} P \quad (7)$$

where α is a constant depending on the shape and boundary conditions of the plate or diaphragm, being 0.00126 for square shape and 0.000977, b the lateral size of the edge clamped diaphragm, and D the flexural rigidity of the diaphragm, defined by $$D = \frac{Eh^3}{12(1-v^2)} \quad (8)$$

h is the thickness of the diaphragm, E Young's modulus, and ν Poisson coefficient of the diaphragm material.

|  | Si (100) | Poly Si | SiO$_2$ Quartz | Amorph. SiO2 |
| --- | --- | --- | --- | --- |
| E (10$^9$ Pa) | 130 | 160 | 72 | 69 |
| v | 0.28 | 0.2 | 0.16 | 0.17 |
| E/12(1 − v$^2$) (10$^9$ Pa) | 11.8 | 13.9 | 6.17 | 5.92 |
| Circular ΔL/P (10$^{-13}$/Pa) | 0.828 b$^4$/h$^3$ | 0.703 b$^4$/h$^3$ | 1.58 b$^4$/h$^3$ | 1.65 b$^4$/h$^3$ |
| Square ΔL/P (10$^{-13}$/Pa) | 1.07 b$^4$/h$^3$ | 0.906 b$^4$/h$^3$ | 2.04 b$^4$/h$^3$ | 2.13 b$^4$/h$^3$ |

Substituting (7) to (5), it follows that $$\frac{I^{(o)}}{I^{(i)}} \approx \frac{F}{2}\left[1 + \sin\left(\frac{4\pi n}{\lambda}S_S P + \phi_o\right)\right] \quad (9)$$

where static sensitivity $S_S$ in this work is 0.347 μ/Pa. When acoustic wave is detected, the dynamic sensitivity of the diaphragm $S_D$ is $>>S_S$.

Figure 4:
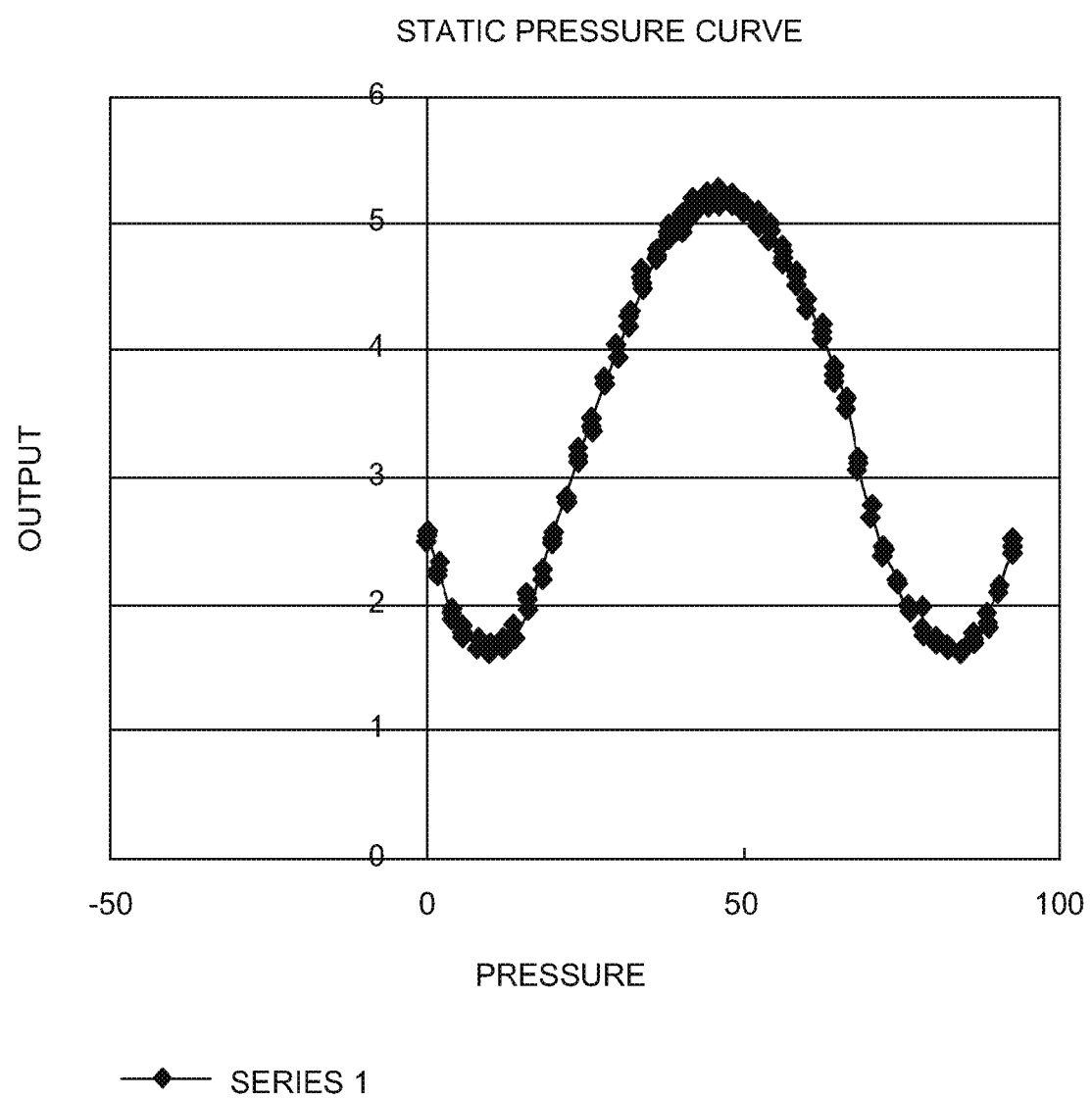
FIG. 4 a graphical representation of the static measurement of output optic intensity as a function of pressure. The pressure is in units of centimeter of water column, and the optical output power is in arbitrary units.

The approximately harmonic dependence of optical power output $I^{(o)}$ on pressure P as depicted by equation (9) is experimentally verified (FIG. 4). The present embodiment that generated the experimental results is a pure Fabry-Perot interferometer device with the diaphragm-fiber structure.

The intrinsic fundamental mode frequency of the diaphragm is [3]

$$f_o = \frac{2\lambda^2}{\pi b^2}\sqrt{\frac{D}{\rho_p}} \quad (10)$$

where λ is the eigen value depending on the shape and boundary condition of the diaphragm, b the lateral size of the diaphragm, $\rho_p$ the plate mass density, equal to ρh, ρ being the density of material of the plate. Therefore $$f_o = \frac{2\lambda^2}{\pi}\sqrt{\frac{E}{12\rho(1-v^2)}}\frac{h}{b^2} \quad (11)$$

Figure 5:
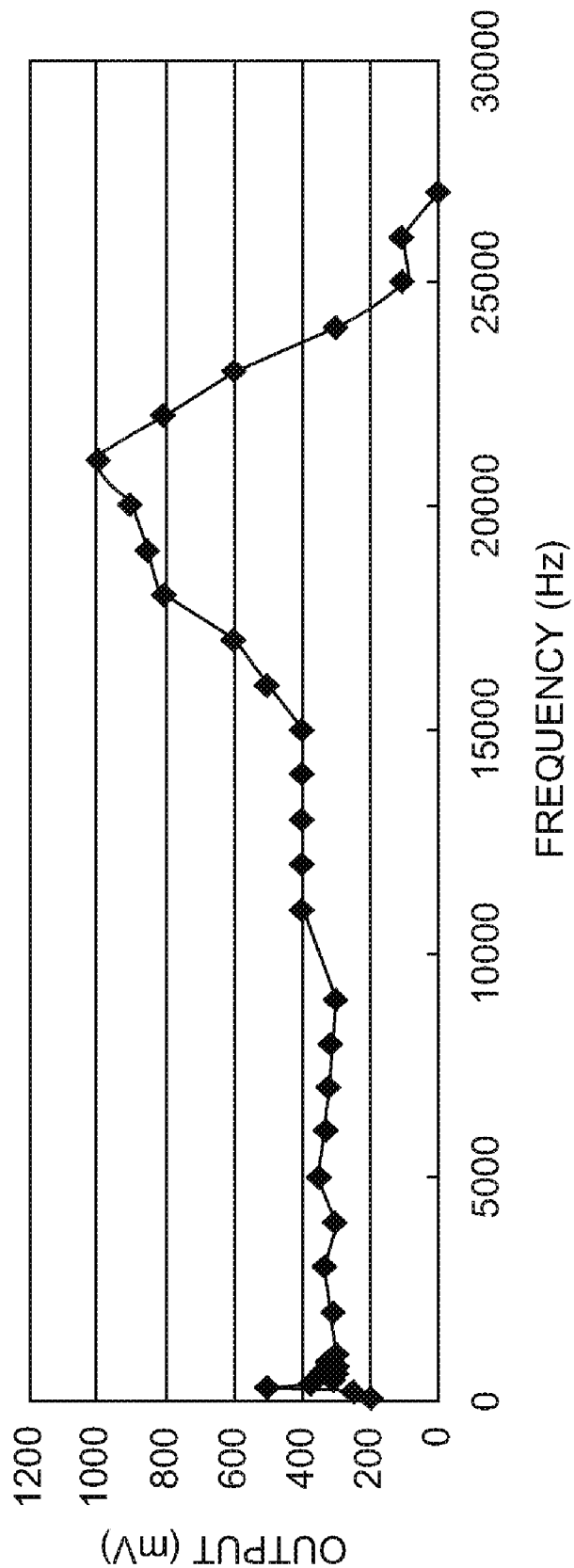
FIG. 5 represents the frequency response of the microphone with 2 μ thick diaphragm and 5 μ gap.

For this embodiment of the fabricated microphone, by controlling the time of silicon oxidation, the thickness of the diaphragm can be varied while keeping the lateral size a constant so that the same mask set can be used. Therefore, the frequencies of the fundamental and higher order modes of the diaphragm can meet the need. The experimental results of frequency response for this embodiment are as shown in FIG. 5.

Applicant has attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

REFERENCES

[1] M. Born and E. Wolf, *Principles of Optics*, p. 327, 6th Edition, Pergamon Press, (1980).
[2] S. Timoshenko, *Strength of Materials*, Part II, 3rd Edition, p. 97, D. Van Nostrand Co., 1956.
[3] A. W. Leissa, *Vibration of Plates*, Chapter 2 and 4, Scientific and Technical Information Division, Washington, D.C., 1969.

We claim:

1. A fiber optic microphone comprising:
   an embossed diaphragm;
   a single mode fiber comprising an endface; and
   an interference gap between the diaphragm and the endface, wherein the embossed portion of the diaphragm minimizes the width of the interference gap.

2. The fiber optic microphone of claim 1 that is fabricated using micro electric mechanical system technology.

3. The fiber optic microphone of claim 1, wherein the embossed portion is configured to keep the optical fiber aligned with the diaphragm.

4. The fiber optic microphone of claim 1 that exhibits multiple periods of Fabry-Perot interference.

5. The microphone of claim 1, wherein the diaphragm is mechanically clamped.

6. The microphone of claim 5, wherein the diaphragm is clamped between a stainless steel ferrule and a washer.

7. The microphone of claim 6, wherein the washer is held in place by a disk spring.

8. The microphone of claim 7, wherein the disk spring is held in place by a window cap.

9. The microphone of claim 1, wherein the diaphragm is formed from silicon dioxide.

10. The fiber optic microphone of claim 9, wherein the thickness of the diaphragm is varied by controlling the time of the oxidation of the silicon dioxide.

11. A method for forming a fiber optic microphone comprising:
    forming a diaphragm having a thickness of less than about 3 microns;
    embossing a portion of the diaphragm to obtain a substantially uniform interference gap between the diaphragm and an endface of an optic fiber; and
    clamping the microphone in order to fix the location of the diaphragm with respect to the optic fiber.

12. The method of claim 11, further comprising clamping the diaphragm between a stainless steel ferrule, wherein the stainless steel ferrule circumferentially envelopes the optic fiber, and a washer.

13. The method of claim 11 further comprising forming the diaphragm from silicon dioxide.

14. The method of claim 13 further comprising varying the thickness of the diaphragm by controlling the time of the oxidation of the silicon dioxide.

15. The method of claim 11 further comprising establishing a perpendicular orientation of the embossed portion diaphragm with respect to the endface of the fiber.

16. A fiber optic microphone comprising:
    a single mode fiber comprising an endface;
    a diaphragm, wherein said diaphragm is embossed at least in order to keep the fiber aligned with the diaphragm; and
    an interference gap between the diaphragm and the endface.

17. The fiber optic microphone of claim 16 wherein said diaphragm is mechanically clamped.

18. The fiber optic microphone of claim 16 wherein the diaphragm is formed from silicon dioxide.

19. The fiber optic microphone claim 18, wherein the thickness of the diaphragm is varied by controlling the time of the oxidation of the silicon dioxide.

* * * * *